Jan. 7, 1969   H. A. VANDERSIP   3,420,377
DUAL, PLEATED ELEMENT FILTER ASSEMBLY
Filed July 1, 1966   Sheet 1 of 2
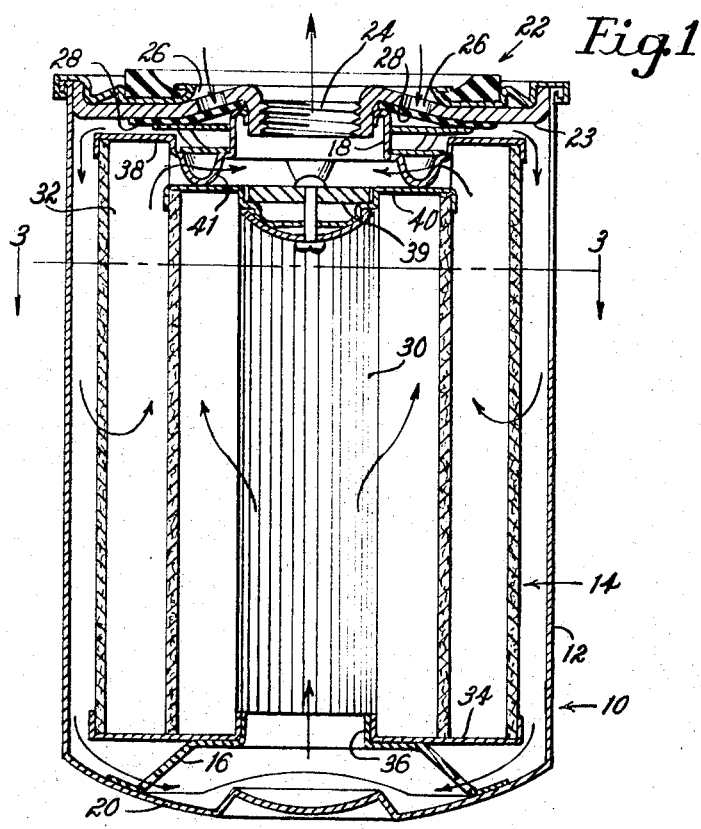
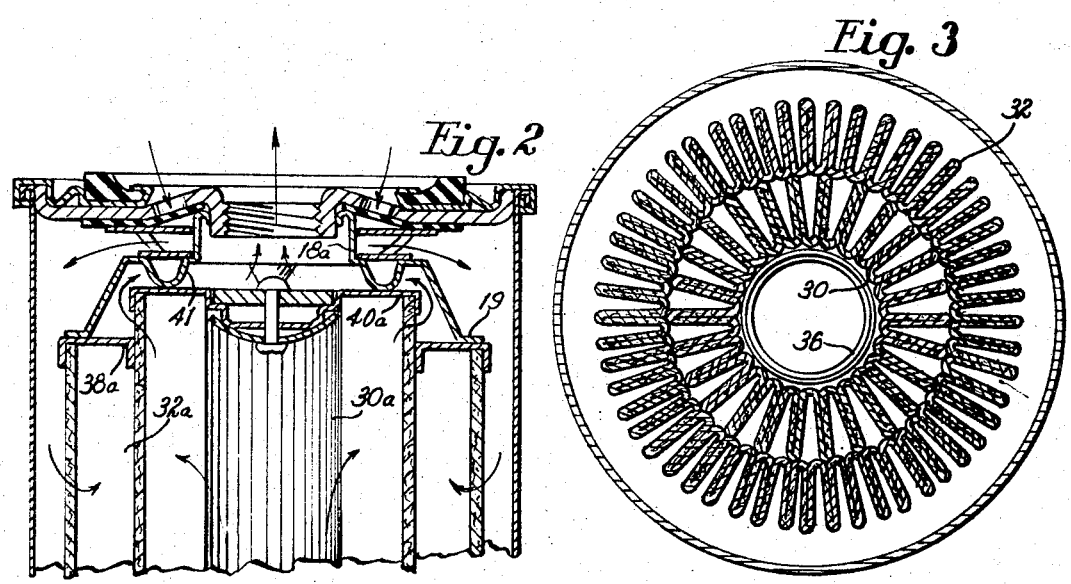

United States Patent Office 3,420,377
Patented Jan. 7, 1969

3,420,377
DUAL, PLEATED ELEMENT FILTER ASSEMBLY
Henry Annis Vandersip, Cranston, R.I., assignor, by mesne assignments, to Fram Corporation, East Providence, R.I., a corporation of Delaware
Filed July 1, 1966, Ser. No. 562,333
U.S. Cl. 210—315            12 Claims
Int. Cl. B01d 27/06

ABSTRACT OF THE DISCLOSURE

A fluid filter having two elements of pleated material with opposing filter flow directions. One element surrounds the other, substantial portions of the peripheries of the two elements are in direct physical contact, and a common collection volume is provided adjacent the peripheries.

---

This invention relates to dual element fluid filters of the type in which one filtering element surrounds a second filtering element.

Primary objects of the invention are to provide such a dual element filter in which a minimum of parts and hardware are required, which is simple and inexpensive to manufacture, and which has high filtering efficiency in terms of reducing the canister volume required to house a given area of filtering media or increasing the amount of media which may be placed in a given canister volume.

In general, the invention features a filtering device having at least two filter elements (which may be formed from a single element folded on itself), one opposed to the other, with a substantial portion of the periphery of the one element and a substantial portion of the periphery of the other element being relatively positioned for mutual support during fluid flow through the elements. The two elements have opposing filtering flow directions and a common collection volume for fluid filtered through the two elements is provided adjacent their adjacent peripheries. In preferred embodiments the elements are cylindrical and one surrounds the other, at least one of the elements is pleated, the pleat edges are in direct contact with the adjacent periphery of the other element, and filtered fluid from both elements passes axially through the V-section volumes formed by the fan-shaped structure of the outer periphery of the inner element and the hypocycloidal structure of the inner periphery of the outer element. In such configuration, where both elements have substantially equal inlet pressures and a common outlet pressure, the two elements support each other without the need for any intervening member, and by selecting elements having equal areas per inch of height the net force differential becomes zero, because the forces acting on the mutually contacting portions of the elements are equal and opposite to each other.

Other objects, features, and advantages will appear from the following description of preferred embodiments of the invention, taken together with the attached drawings thereof, in which:

FIG. 1 is a vertical section of a filter according to the invention;

FIG. 2 is a view similar to FIG. 1 of another embodiment of the invention;

FIG. 3 is a section through 3—3 of FIG. 1;

Figure 4:
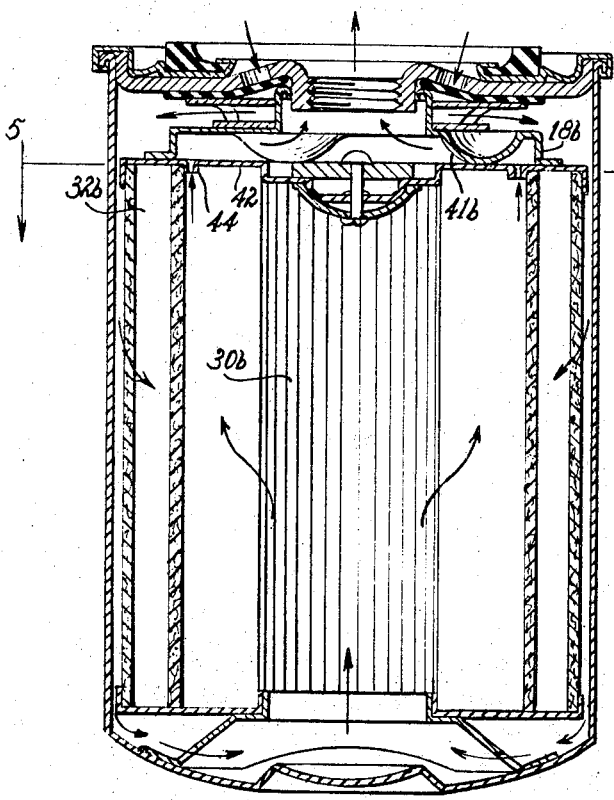
FIG. 4 is a view similar to FIG. 1 of another embodiment of the invention.

Filtering device 10 (FIG. 1) includes cylindrical metal canister 12 inside of which filter cartridge 14 is supported, spaced from the inner walls of the canister, between leaf spring 16 and cartridge seat 18. Canister 12 is closed at its bottom 20 and at its top is capped by end wall assembly 22 through which pass central outlet opening 24 and a ring of inlet openings 26 surrounding outlet 24. For critical applications, gasket 28 seals between seat 18 and heavy gauge reinforcing wall 23.

Cartridge 14 has a concentric pair of generally hollow cylindrical porous pleated paper (e.g. of the type normally used for liquid and gas filtration) filter elements 30 and 32, the pleat folds at the outer periphery of inner element 30 being in contact with the pleat folds at the inner periphery of the outer element 32 (FIG. 3). In each filter element the spacing between adjacent pleat fold edges is greater at the outer than the inner periphery. Preferably the number of pleats in each element is such that the folds at the inner periphery of each element touch each other, forming a virtually continuous porous wall. The inside diameter of element 30, the outside diameter of element 30 (substantially equal to the inside diameter of element 32), and the outside diameter of element 32 are substantially in the ratio of 1:2:3 to maximize filtration surface area and to permit making both elements of the same pleat width. Element 32 has twice the number of pleats as has element 30, if both elements are made of the same media. If the elements are made different caliper media, the pleat ratio will be modified by the caliper ratio.

The bottoms of elements 30, 32 are coterminous and are capped by common fluid impervious end cap 34 (e.g. cardboard) sealed to the pleats by a plastisol or other suitable adhesive. Opening 36 through cap 34 communicates with the interior of element 30. The top of element 32 is sealed with annular end cap 38 and extends somewhat above annular thin metal end cap 40 sealing the top of element 30 and its hollow center. Relief valve assembly 39 is riveted to and closes the center of end cap 40. Seat 18 is integral with end cap 38, and hemispherical downward projections 41 are located close to end cap 40 to prevent excessive axial shifting of the inner filter element 30 under high pressure drop conditions.

In operation, fluid to be filtered is introduced through inlets 26 into canister 12 and passes around cartridge 14. Some of the fluid passes radially inwardly through element 32, being filtered by the outer surface of that element. The remaining fluid passes under end cap 34, up through opening 36 to the inside of element 30 and radially outward through element 30, being filtered by the inner surface of that element. The elements are usually assembled so that their wire sides are in contact with each other, thereby exposing the felt sides upstream to the fluid being filtered, which is the general method of using pleated paper filtering media. All of the fluid ends up between the elements in the relatively wide spacing between the pleats of element 30 at its outer periphery and passes axially of the elements, around the outer edge of end cap 40, under cartridge seat 18 and out through outlet 24. The forces exerted by the fluid upon the filtering surfaces of the two elements oppose each other and, by virtue of the relative positioning of the elements for mutual mechanical support at their contacting peripheries, in large part or entirely cancel out, thereby eliminating any need for the usual support center tube or center tubes which are found in conventional single and dual element constructions. Any net force differential across the mutually contacting peripheries can be eliminated by varying filter media thickness (FIG. 6) or employing substantially a 2:4:5 (FIG. 5) diameter ratio (instead of the 1:2:3 ratio described above), although this will result in a slight decrease in media area.

In the embodiment of FIG. 2, outer filter element 32a, capped by annular end cap 38a terminates at its top below end cap 40a capping the top of the inner element 30a.

Cartridge seat 18a has a stepped portion 19 that is welded or otherwise attached in a leakproof manner to end cap 38a. Since most of the axial flow of filtered fluid is between the spaced outer folds of the pleats of the inner element, end cap 38a does not hinder this axial flow as much as does end cap 40 in the embodiment of FIG. 1. Hence, this embodiment is preferable for filtering at higher flow rates. Structure and operation is otherwise the same as in the embodiment of FIG. 1.

The difference in axial extent of the two filtering elements in the forms of FIGS. 1–3 should be no greater than necessary to give an acceptable restriction to flow. Very large pressure drops may be borne by this unsupported portion of media if its length is not excessive.

Figure 5:
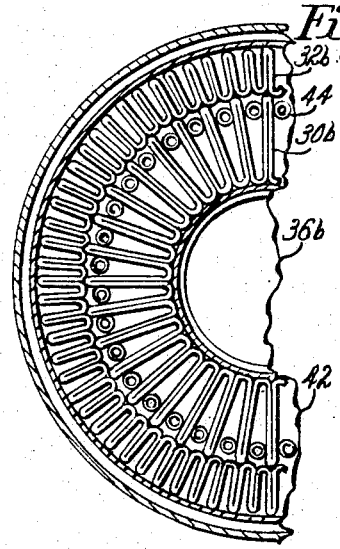
FIG. 5 is a section through 5—5 of FIG. 4.

In the embodiment of FIGS. 4–5, showing substantially a 2:4:5 diameter ratio, the inner and outer elements 30b and 32b are of equal length and are capped by a single end cap 42 at their upper end. Tubular extensions 44 are provided in end cap 42 and extend into the spaces between the outer pleat folds of element 30b. Operation and structure is otherwise the same as in the embodiments of FIGS. 1–3, except that, after filtration, the fluid leaves the interspace between the elements 30b, 32b through tubular elements 44.

In FIG. 5 note that the number of pleats in the outer element is twice that of the inner element, and that the depth of the pleats in the inner element is twice that of the depth of the pleats in the outer element. Thus, the total filter surface areas of the elements are equal to each other.

In all forms shown, when using pleated paper media of the same caliper and porosity for both elements and a diameter ratio substantially of 1:2:3 as seen in FIGS. 1–3, the optimum filtering surface area is made available within a given canister volume. The net force differential between the elements also is reduced substantially so that usual center tubes or supports on the downstream sides of the elements are not required, each element supporting the other to a large extent.

The net force differential between the elements can be eliminated entirely in all forms illustrated by adopting a diameter ratio substantially of 2:4:5 as seen in FIGS. 4 and 5. This effect is due to the fact that the filtering surface areas of the inner and outer elements are equal, so the forces on each are equal and opposed in direction. This diameter ratio reduces somewhat the amount of total filtering surface area that may be arranged within a given volume. However, where small canister volume is not a critical requirement and when the inconvenience or expense of different depths of pleats in the two elements is not a factor, this ratio may be preferred because of better static balance between the elements.

Figure 6:
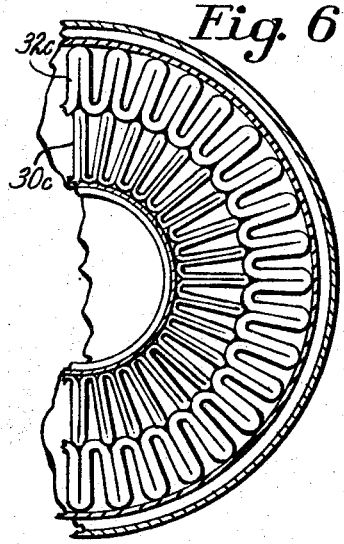
FIG. 6 is a view similar to FIG. 5 showing another embodiment of the invention.

In the embodiment of FIG. 6, elements 30c and 32c have the same number and depth of pleats (giving manufacturing economy), and the outer element is made of paper having twice the thickness of that of the inner element, so that the pleats of the two elements are in one to one mutually supporting contact. In a recirculating system, the efficiency of one element is advantageously greater than that of the other element giving an automatic, self-adjusting flow ratio between the two elements, while maintaining a force balance across the two elements, resulting in increased filtration performance.

The two filtering elements of the invention need not of course constitute right cylinders, but may be frustroconical or assume other suitable configurations for mutual support.

It will be noted that the invention makes possible the assembly of a filter which will yield the same performance as a prior are conventional filter in a smaller envelope. By the same token, according to the invention, a filter can be built which will have the same efficiency as a conventional filter of the same size, but a longer life; or greater efficiency with the same life; or both longer life and greater efficiency but not to such a great extent.

The novel filter of the invention has particular advantages where, as in use on some automotive engines, it is necessary or desirable to mount it upright i.e. inverted from the position shown in FIG. 1. Many conventional filters when so mounted would form an air trap within the cover (corresponding to the bottom 20) which is charged with compressed air during operation of the engine. When the latter is stopped this trapped air expands and drives the oil from the engine parts, thus leaving them dry when the engine is next started. It will be noted that due to flow of oil through the dome formed by the bottom 20 air can never collect in this location no matter what the position of the filter during use.

Other embodiments (e.g., the substitution of a self-supporting molded porous mass of resin impregnated fibrous material for one or both of the pleated filtering elements, the addition of a force transmitting member between the filter elements, the formation of both elements from a single length of pleated paper folded on itself, etc.) will occur to those skilled in the art and are within the following claims.

What is claimed is:

1. A fluid filtering device having at least one pair of filtering elements of pleated material wherein
   one of said elements surrounds the other,
   said one element has pleats arranged to define a virtually continuous porous wall as the inner periphery thereof,
   said other element has pleats with spaced vertices at the outer periphery thereof,
   said spaced vertices and said wall are relatively positioned for effective direct mutual support,
   said two elements have opposing filtering flow directions, and
   common collection volumes for fluid filtered through said two elements are defined by adjacent pleats of said other element and said wall.

2. The device of claim 1 wherein said elements are coterminous at at least one end, and tubular fluid collection elements are provided between said elements at said one end.

3. The device of claim 1 wherein tubular fluid collection elements extend between the pleat folds of the outer periphery of said inner element.

4. The device of claim 1 wherein said elements have equal number and depth of pleats, and the material of the outer element is twice the thickness of that of the inner element.

5. The device of claim 1 wherein the material of one element is of greater efficiency that that of the other element.

6. The device of claim 1 whereby the thicknesses of said two elements are chosen to produce a substantial balance of forces across said elements.

7. The device of claim 1 wherein a first of said elements extends axially beyond one end of the second of said elements.

8. The device of claim 7 wherein the inner element extends axially beyond one end of the outer element.

9. The device of claim 8 wherein said elements are cylindrical, said pleats extend parallel to the axis of said cylinder, said elements are coterminous at one end and capped there by a single end cap having an opening communicating with the interior of said inner element, said outer element is capped at its remaining end by an annular end cap the inner perimeter of which is adjacent the outer pleated edges of said inner element, and said inner element is capped at its remaining end by an imperforate end cap.

10. The device of claim 9 wherein said device is supported in a housing, a fluid input is in communication with the outer periphery of said outer element and with the inner periphery of said inner element through said opening in said single end cap, and a fluid output is in communication with the portion of the inner periphery of said outer element located between said annular and imperforate end caps.

11. The device of claim 9 wherein the inner diameter of said inner element, the outer diameter of said inner element, and the outer diameter of said outer element are substantially in the ratio of 1:2:3.

12. The device of claim 9 wherein the inner diameter of said inner element, the outer diameter of said inner element, and the outer diameter of said outer element are substantially in the ratio of 2:4:5.

References Cited

UNITED STATES PATENTS

| 2,747,744 | 5/1956 | Gretzinger | 210—315 X |
| 2,936,891 | 5/1960 | Kukowski et al. | 210—131 |
| 3,021,955 | 2/1962 | Joyce | 210—315 X |
| 3,211,292 | 10/1965 | Bull | 210—342 |
| 3,270,884 | 9/1966 | Bremer | 210—315 X |
| 3,290,870 | 12/1966 | Jensen | 210—315 X |
| 3,297,162 | 1/1967 | Mouwen | 210—315 X |
| 3,331,509 | 7/1967 | Gray | 210—315 X |

FOREIGN PATENTS 321,960  10/1934  Italy.

REUBEN FRIEDMAN, *Primary Examiner.*

FRANK A. SPEAR, JR., *Assistant Examiner.*

U.S. Cl. X.R.

55—484, 521; 210—342, 493